United States Patent
Mahapatra et al.

(10) Patent No.: US 10,771,430 B1
(45) Date of Patent: Sep. 8, 2020

(54) DYNAMIC RESOURCE CONFIGURATION SYSTEM AND METHOD FOR DISTRIBUTED COMPUTING ENVIRONMENTS

(71) Applicant: VCE Company, LLC, Richardson, TX (US)

(72) Inventors: Akshaya Mahapatra, San Jose, CA (US); Michael Tan, Palo Alto, CA (US); Dirk N. Milotz, San Jose, CA (US)

(73) Assignee: EMC IP Holding Company LLC, Round Rock, TX (US)

( * ) Notice: Subject to any disclaimer, the term of this patent is extended or adjusted under 35 U.S.C. 154(b) by 302 days.

(21) Appl. No.: 14/668,751

(22) Filed: Mar. 25, 2015

(51) Int. Cl.
*H04L 12/24* (2006.01)
*H04L 29/12* (2006.01)

(52) U.S. Cl.
CPC ...... *H04L 61/2015* (2013.01); *H04L 41/0893* (2013.01)

(58) Field of Classification Search
CPC ......... H04L 41/00; H04L 41/02; H04L 41/08; H04L 41/082; H04L 41/0823; H04L 41/0826; H04L 41/083; H04L 41/0833; H04L 41/0836; H04L 41/084; H04L 41/0843; H04L 41/0846; H04L 41/085; H04L 41/0869; H04L 41/0873; H04L 41/0813; H04L 41/5025; H04L 41/0806; H04L 2025/03656; H04L 7/0004; G01N 2035/00881
USPC .................................................. 709/220–222
See application file for complete search history.

(56) References Cited

U.S. PATENT DOCUMENTS

| | | | | |
|---|---|---|---|---|
| 6,009,103 A | * | 12/1999 | Woundy | H04J 3/1694 370/401 |
| 2002/0075844 A1 | * | 6/2002 | Hagen | H04W 28/16 370/351 |
| 2006/0143432 A1 | * | 6/2006 | Rothman | G06F 9/4416 713/2 |
| 2006/0174036 A1 | * | 8/2006 | Dain | G06F 3/0607 709/245 |
| 2008/0205339 A1 | * | 8/2008 | Brophy | H04W 8/245 370/331 |
| 2008/0301801 A1 | * | 12/2008 | Jothimani | H04L 63/0272 726/15 |
| 2010/0165877 A1 | * | 7/2010 | Shukla | H04L 49/70 370/254 |
| 2013/0117427 A1 | * | 5/2013 | Amano | G06F 9/4416 709/223 |
| 2013/0290694 A1 | * | 10/2013 | Civilini | H04L 41/0806 713/2 |

* cited by examiner

*Primary Examiner* — Younes Naji
*Assistant Examiner* — Da T Ton
(74) *Attorney, Agent, or Firm* — Polsinelli PC (57) ABSTRACT

A dynamic resource configuration system that includes a computer executed application that receives, from resource of the distributed computing environment, a network configuration request message to dynamically configure one or more network parameters of the resource. In response, the application obtains a unique identity of the resource using the received network configuration request message, obtains customized configuration parameters for the resource using the obtained unique identity, and configures the resource using the customized configuration parameters.

16 Claims, 5 Drawing Sheets

DYNAMIC RESOURCE CONFIGURATION SYSTEM AND METHOD FOR DISTRIBUTED COMPUTING ENVIRONMENTS

TECHNICAL FIELD

Aspects of the present disclosure relate to computing devices and, in particular, to a dynamic resource configuration system and method for distributed computing environments.

BACKGROUND

Network configuration protocols, such as the Dynamic Host Configuration Protocol (DHCP), are used for automatically distributing network configuration parameters (e.g., IP addresses, network masks, etc.) for client computing nodes within an Internet protocol (IP) based communication network. Stated differently, some network configuration protocols may automatically assign IP addresses among other things, so that new nodes (e.g., devices) connected to a network are recognized and may receive/send data to other devices. Such automatic configuration techniques alleviate the necessity of manual network configuration. Servers implementing the DHCP protocol conventionally provide IP addresses based on a network segment to which the client belongs. For example, a DHCP service can be configured to respond to a client computing node on a specific network segment and provide an IP address within a specified range (e.g., 192.168.1.2 to 192.168.1.254) allocated to the segment.

SUMMARY

According to one aspect of the present disclosure, a dynamic resource configuration system includes a computer executed application that receives, from a resource of the distributed computing environment, a network configuration request message to dynamically configure one or more network parameters of the resource. In response, the application obtains a unique identity of the resource using the received network configuration request message, obtains customized configuration parameters for the resource using the obtained unique identity, and configures the resource using the customized configuration parameters.

BRIEF DESCRIPTION OF THE DRAWINGS

The various features and advantages of the technology of the present disclosure will be apparent from the following description of particular embodiments of those technologies, as illustrated in the accompanying drawings. It should be noted that the drawings are not] necessarily to scale; however the emphasis instead is being placed on illustrating the principles of the technological concepts. Also, in the drawings the like reference characters refer to the same parts throughout the different views. The drawings depict only typical embodiments of the present disclosure and, therefore, are not to be considered limiting in scope.

DETAILED DESCRIPTION

Embodiments of the present disclosure provide a dynamic resource configuration system for resources (e.g., physical hosts and/or virtual objects) in which those resources may be implemented with a customized configuration according to their characteristics and/or applications deployed on the resources. The dynamic resource configuration system includes a network configuration protocol (e.g., dynamic host configuration protocol (DHCP)) that, when a network configuration server receives a request for automatic network configuration from a resource, the system obtains a unique identity of the resource, obtains any customized resource configuration parameters to be applied to that resource, and configures the resource using the obtained customized configuration parameters.

As previously noted, conventional network configuration protocols, such as DHCP, may provide a requesting resource (e.g., client) with a specified range of addresses. An IP address in the mechanism by which the client is identified in the network and information may be communicated. The range of addresses provided by the conventional DHCP protocol is static and is not easily adaptable according to varying characteristics of the resource to be provisioned. Currently available distributed computing environments can often have more than 100,000 managed resources (e.g., virtual machines, servers, network switches, firewalls, load balancers, storage arrays, etc.) that function in a collaborative manner to accomplish the tasks of the distributed computing environment. Nevertheless, in many cases, these resources may have widely differing characteristics from one another such that each resource or a defined group of resources may have provisioning needs that are distinctively different from other resources.

For example, a distributed computing environment may be deployed with multiple groups of resources that are each allocated to be configured by one of multiple preboot execution environment (PXE) servers during start-up. Using conventional resource configuration approaches, when a resource boots in this environment, it transmits a broadcast message throughout the network to request PXE configuration parameters, but all the DHCP servers respond with IP and PXE boot parameters, the first server to reach the resource is accepted while the others are ignored. Thus, using conventional DHCP and PXE technologies, the likelihood of each resource being configured by its appropriate PXE server is relatively low. To circumvent this problem, groups of resources may be configured one at a time, but this approach is slow, manually intensive, and thus is inefficient in its operation.

Another problem encountered using these conventional configuration approaches involves selective address assignment using conventional network configuration protocols. For example, a need may exist for assigning an IP address based on the applications installed on that resource, but the conventional DHCP protocol does not provide for customized selection of IP addressing based upon installed applications. This problem is further exacerbated in hybrid distributed computing environments, where an application may be distributed over multiple resources that span over a public portion as well as a private portion of the cloud computing environment. Again, the conventional DHCP protocol does not provide for selection of IP addressing according to applications deployed on the resources.

Figure 1:
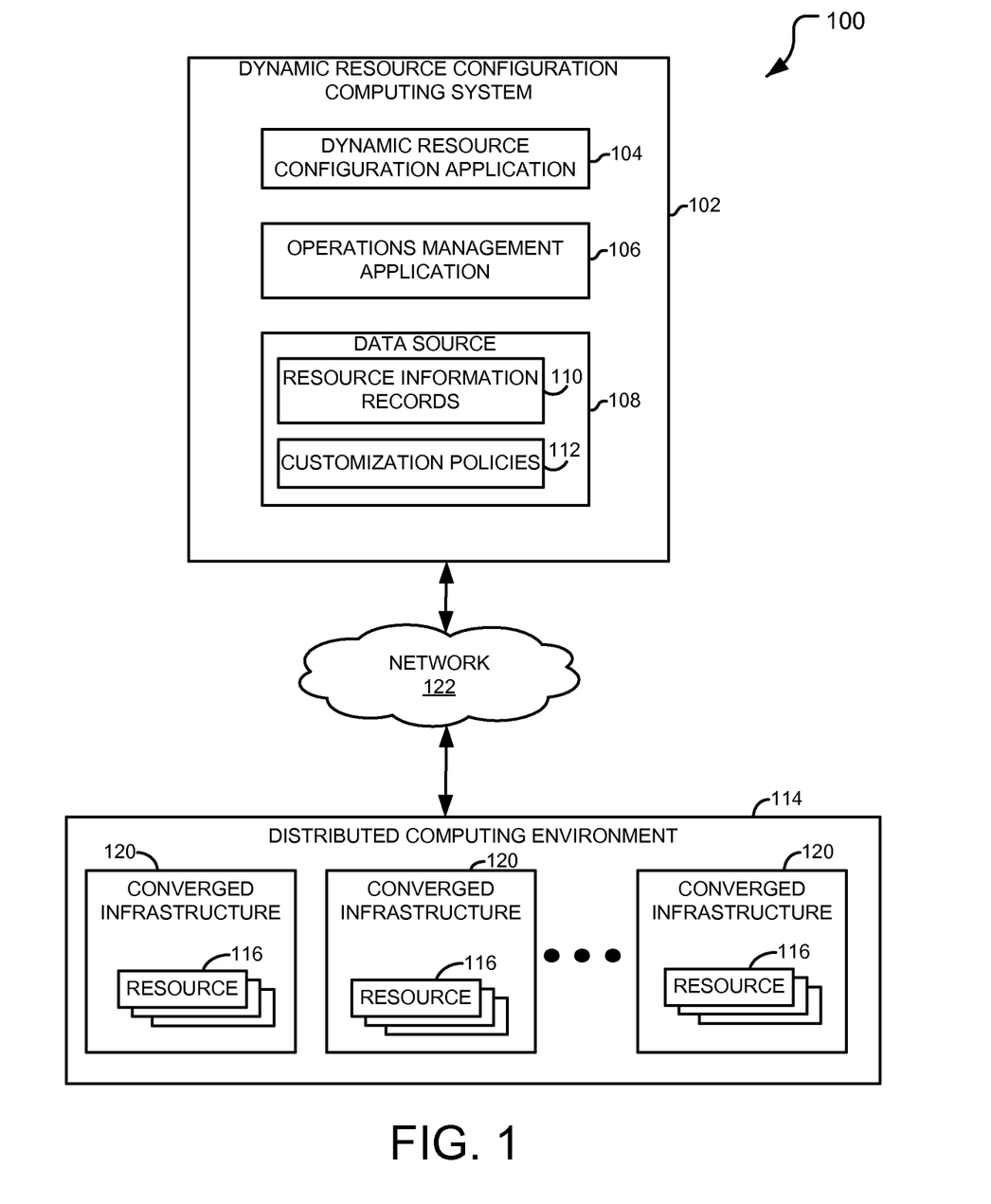
FIG. 1 illustrates an example dynamic resource configuration system according to one embodiment of the present disclosure.

FIG. 1 illustrates an example dynamic resource configuration system 100 according to the teachings of the present disclosure. The system 100 includes a dynamic resource configuration computing system 102 having a dynamic resource configuration application 104, an operations management application 106, and a data source 108 for storing resource information records 110 that maintains characteristic information about the resources 116 of a distributed computing environment 114, and one or more customization policies 112 that may be used to provide a customized configuration for the resources 116. As will be described in detail below, when each resource communicates with the dynamic resource configuration application 104 for automatic configuration of its network parameters, the dynamic resource configuration application 104 obtains a unique identity of the resource 116, from which customized configuration parameters may be obtained using the resource information records 110 and the customization policies 112, and transmits the customized configuration parameters to the requesting resource.

Certain embodiments of the dynamic resource configuration system 100 may provide advantages not heretofore provided by conventional resource configuration systems. For example, customized configuration parameters may be provided for resources in a complex computing environment, where the resources may be different from one another without requiring significant manual intervention to ensure each resource is configured consistently.

Generally speaking, the dynamic resource configuration application 104 executes a network configuration protocol that dynamically configures each resource 116 for communication with one another. In one example, the resources are being deployed in an internally structured communication network of the distributed computing environment 114, which network functions according to IP. When each resource 116 is booted (e.g., during initial start-up, system re-configuration, etc.), the resource initiates a dynamic address acquisition technique to obtain suitable address parameters from the dynamic resource configuration application 104 using, for example, a DHCP discovery request message. When the dynamic resource configuration application 104 receives this request, it identifies which resource issued the request, such as by reading the source media access control (MAC) address portion of the received request message. The MAC address comprises a portion of a communication packet that uniquely identifies a communication interface of the resource. The unique identity of the resource is then used to access characteristic information (e.g., type of resource, deployed applications, etc.) associated with that resource using a resource information record 110 for that resource 116 stored in the data source 108. The application 104 then obtains any customized configuration parameters to be applied to the resource 116 using the customization policies 112. In a particular example in which the network configuration protocol comprises a DHCP protocol, the customized configuration parameters may be provided to the resource in a DHCP offer message transmitted to the resource 116 in response to a DHCP discovery message.

The data source 108 stores resource information records 110 and customization polices 112. The resource information records 110 maintain characteristic information about some, most, or all resources 116 in the distributed computing environment 114. The characteristic information may include, for example, its type (e.g., physical host, a virtual object, or a communication device, such as a switch, router, or firewall appliance), group information, deployed applications, and the like. The customization policies 112 may store information associated with how customized parameters are applied to each resource 116 based upon its characteristic information. For example, one customization policy 112 may specify that, when a resource 116 has a certain deployed application, the application 104 allocates a specified range of addresses to be used for that resource's network configuration. As another example, another customization policy 112 may specify use of a certain PXE server according to the manufacturer of a given resource 116. The customization policies 112 may be updated and/or changed as needed.

In one embodiment, the dynamic resource configuration application 104 operates with the operations management application 106 collectively to configure the resources 116. In general, the operations management application 106 manages the operation of the resources 116 by, provisioning resources, de-provisioning resources, configuring one or more operational parameters on each resource 116, and the like. Any suitable type of operations management application may be implemented with the teachings of the present disclosure. In one embodiment, the operations management application includes a vSphere™ software suite that is available from VMware Corporation, which is headquartered in Palo Alto, Calif.

The dynamic resource configuration computing system 102 and the distributed computing environment 114 communicate with one another using a communications network 122. In one embodiment, the dynamic resource configuration computing system 102 and the distributed computing environment 114 communicate using the Internet, an intranet, or another wired and/or wireless communication network 122. Alternatively or additionally, the dynamic resource configuration computing system 102 and the distributed computing environment 114 communicate with one another using any suitable protocol or messaging scheme. For example, they may communicate using a Hypertext Transfer Protocol (HTTP), extensible markup language (XML), extensible hypertext markup language (XHTML), or a Wireless Application Protocol (WAP) protocol. Other examples of communication protocols exist. For example, the dynamic resource configuration computing system 102 and the distributed computing environment 114 may communicate with one another without the use of a separate and a distinct network, and may be directly connected.

In one specific implementation, the distributed computing environment 114 may include multiple converged infrastructures 120 each comprising multiple resources 116 that may include, for example, physical hosts (e.g., blade computing devices) that each executes (e.g. hosts) one or more virtual objects. Nevertheless, the distributed computing environment 114 may include any type (e.g., a computer cluster, a computing grid, a blade array, etc.) that includes any type and number of resources. The resources 116 of the distributed computing environment 114 generally refer to computing devices that perform some function of the overall operation of the distributed computing environment 114. Examples of such computing devices may include, for example, laptop or notebook computers, workstations, tablet computers, and the like, and/or complex computing structures, such as clusters, unified computing systems, fabric-based computing systems, and dynamic infrastructures. The computing devices may also include other communication devices, such as switches, routers, firewall appliances, or other communication device that facilitates communication among multiple other computing devices. The distributed computing environment 114 may also include distributed computing systems, such as storage arrays, network resource, compute devices, and/or any combination thereof.

Figure 2A:
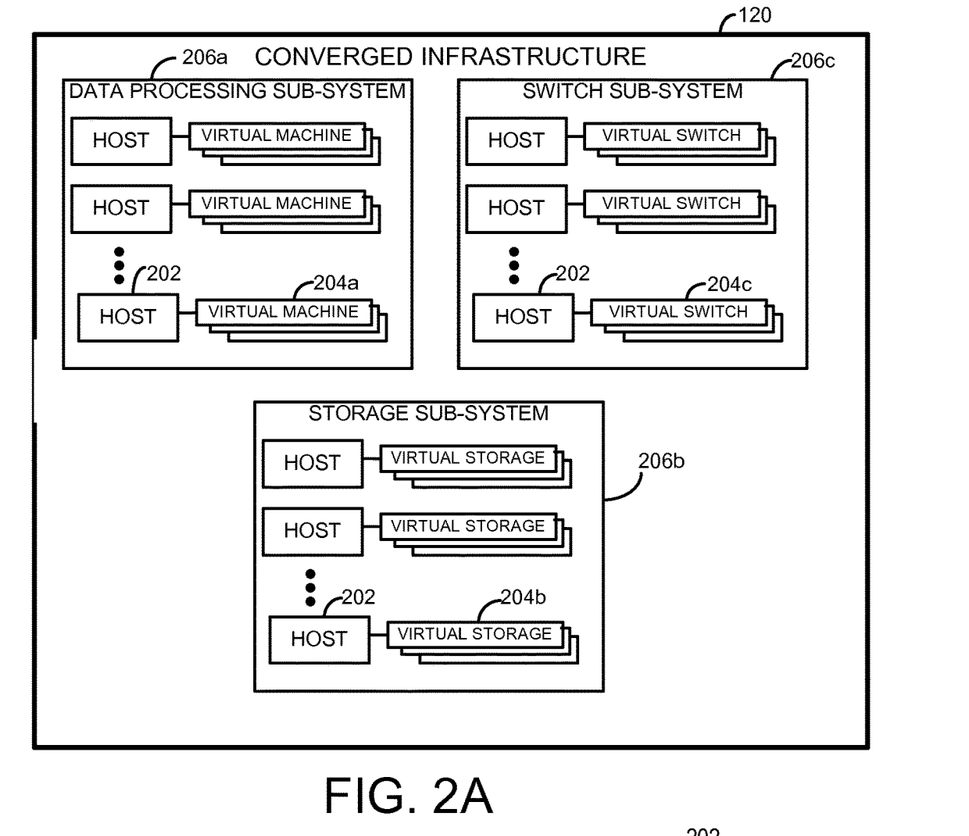
FIGS. 2A and 2B illustrate an example converged infrastructure that may be implemented as a portion of the distributed computing environment according to one embodiment of the present disclosure.
Figure 2B:
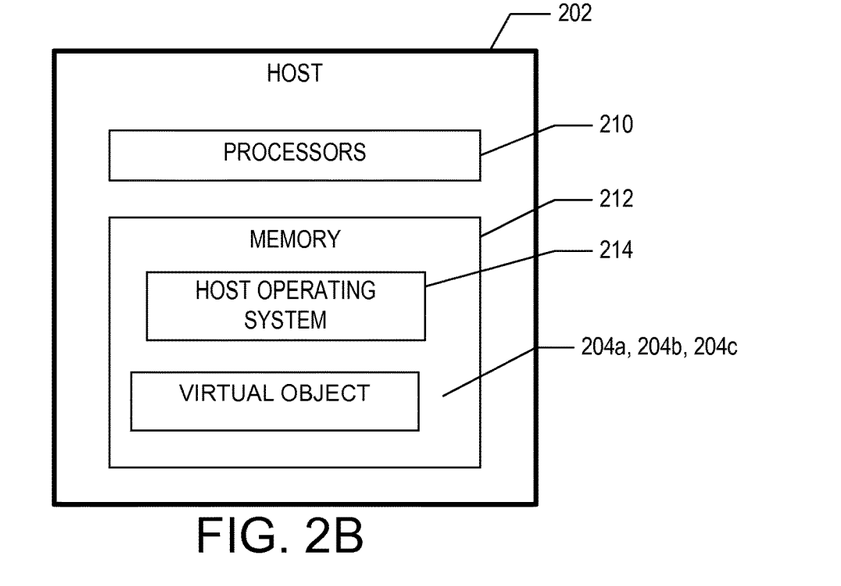

FIGS. 2A and 2B illustrate an example converged infrastructure 120 that may be implemented as one or a portion of a distributed computing environment 114 according to the teachings of the present disclosure. For example, multiple converged infrastructures 120 as described herein may be configured to communicate with one another using a communication network, such as the communication network 122 to form at least a portion of the distributed computing environment 114. The converged infrastructure 120 may be any type having multiple hosts 202 that each executes one or more virtual objects (e.g., virtual machines 204a, virtual storage objects 204b, and virtual switch objects 204c). The hosts of a converged infrastructure are often referred to as compute servers. Nevertheless, in this disclosure, the term 'host' may be interpreted as any physical device and/or component that supports the operation of virtual resources 116 and services provided by those virtual resources. The particular converged infrastructure 120 as shown includes several sub-systems, such as a data processing sub-system 206a, a data storage sub-system 206b, and a switch sub-system 206c. Nevertheless, it should be understood that other converged infrastructures 120 may include additional, fewer, or different types of sub-systems without departing from the spirit and scope of the present disclosure.

In one aspect, each converged infrastructure 120 includes a combination of these sub-systems or other sub-systems that are packaged and interconnected in a standardized manner for ease of maintenance and use. Converged infrastructures such as these are often implemented in environments where relatively high reliability and/or availability are desired, such as in an enterprise environment. Nevertheless, it is contemplated that any converged infrastructure, such as a computer cluster, computing grid, blade array, and/or other converged infrastructure may be managed using the teachings of the present disclosure. For example, a converged infrastructure 120 such as that shown includes components found in Vblock™ System infrastructure packages available from VCE, LLC, which is located in Richardson, Tex.

In one aspect, the data storage sub-system 206b includes computer-readable memory structures for storing data used by the converged infrastructure 120, which may include network attached storage (NAS) arrays and/or storage area network (SAN) arrays that are facilitated by multiple virtual objects (e.g., virtual storage objects 204b). The switch sub-system 206c provides for communication among the various sub-systems of the converged infrastructure 120, and may include components, such as fabric interconnect systems, Ethernet switches/routers, multilayer director switches (MDSs), and the like. The data processing sub-system 206a executes applications that access, store, and otherwise manipulate data stored by the converged infrastructure 120. For a particular example, either of the data storage sub-system 206b, the switch sub-system 206c, and/or the data processing sub-system 206a may comprise a blade computing platform having multiple hosts (e.g., blade computing devices) that each executes one or more virtual objects.

Each sub-system includes multiple hosts 202 that each executes one or more virtual objects, which in this particular example, are virtual machines (VMs) 204a, virtual storage objects 204b, and virtual switch objects 204c. For example, virtual objects, such as the VMs 204a may include software-based operating systems that are emulated on their respective hosts, which are physical computing devices. For each host, its respective VMs may be managed by a hypervisor that provides a virtual architecture for each VM's operation and controls various aspects of their operation. One example of a suitable hypervisor includes the VMware ESX™ software suite that is available from VMware corporation, which is located in Palo Alto, Calif.

FIG. 2B illustrates an example host 202 implemented on each converged infrastructure 120 according to one aspect of the dynamic resource configuration system 100. The host 202 is a computing or processing device that includes one or more processors 210 and a memory 212. For example, the host 202 can be a personal computer, such as a laptop or notebook computer, a workstation, or other processing device such as a tablet computer. In a particular embodiment, the host 202 is a rack mounted host, such as blade host in which multiple blade hosts share a common backplane for communication with one another and for receiving power from a rack mounted power distribution unit. The memory 212 stores a host operating system 214 and one or more virtual objects (e.g., VMs 204a, virtual storage objects 204b, and virtual switch objects 204c) that are executed by the processor 210. The host operating system 212 controls and manages the operation of the virtual objects executed on the host 202. For example, control signaling for starting, stopping, and/or changing operating parameters of each virtual object is managed through the host operating system 212.

Figure 3:
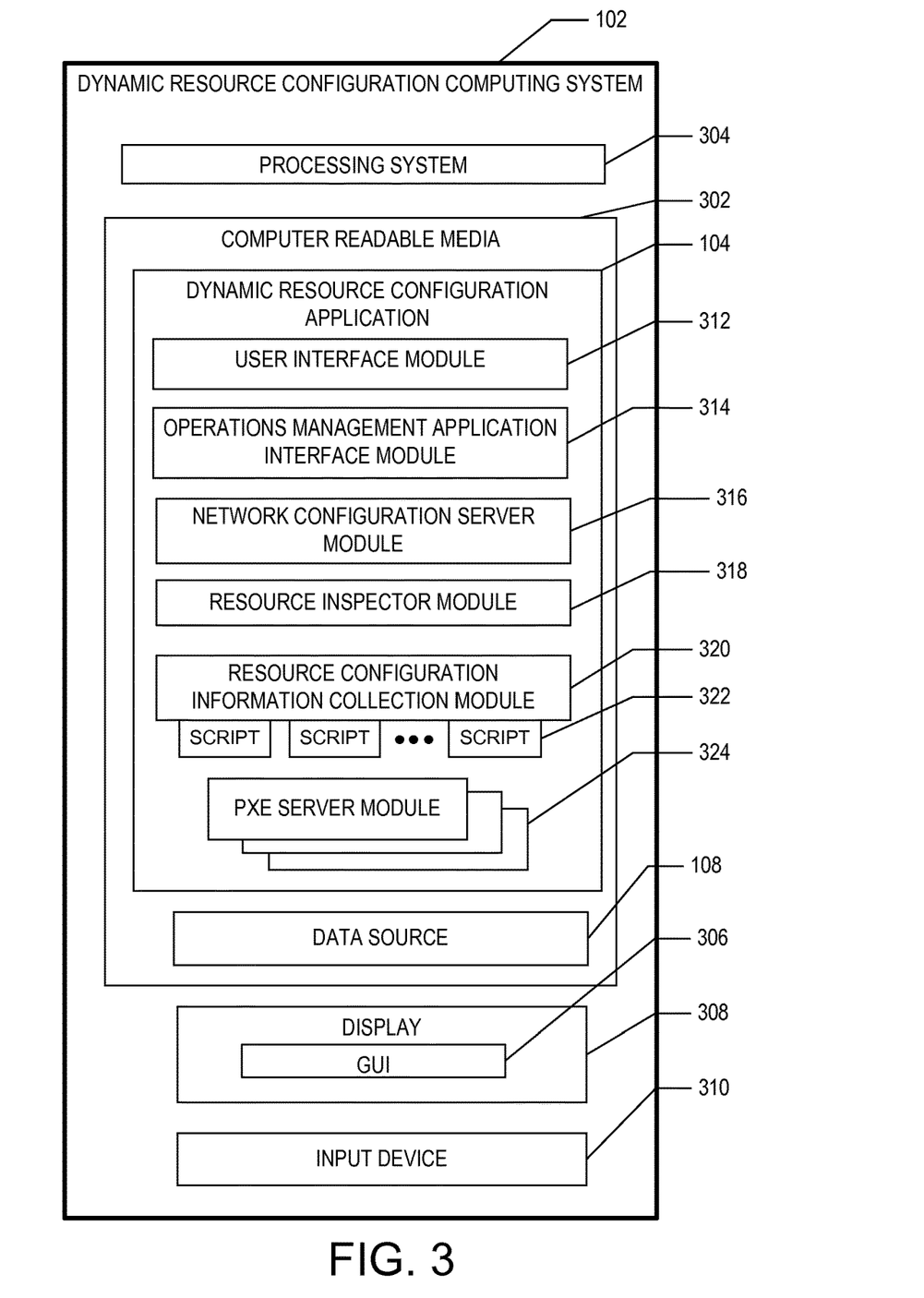
FIG. 3 illustrates a block diagram of an example dynamic resource configuration application executed on the dynamic resource configuration computing system according to one embodiment of the present disclosure.

Referring now in more detail to FIG. 3, a block diagram of an example dynamic resource configuration application 104 executed on the dynamic resource configuration computing system 102, is depicted according to one aspect of the present disclosure. The dynamic resource configuration application 104 is stored in a computer readable media 302 and executed on a processing system 304 of the dynamic resource configuration computing system 102. The computing system 102 may include any type of computing system, such as one or more personal computers, mobile computers and/or other mobile devices, and other hosts.

According to one aspect, the dynamic resource configuration computing system 102 also includes a graphical user interface (GUI) 306 displayed on the display 308. The dynamic resource configuration computing system 102 includes an input device 310, such as a keyboard or a pointing device (e.g., a mouse, trackball, pen, or touch screen) to enter data into or interact with the GUI 306. According to one aspect, the dynamic resource configuration application 104 includes instructions or modules that are executable by the processing system 304 as will be described in detail herein below.

The computer readable media 302 includes volatile media, nonvolatile media, removable media, non-removable media, and/or another available medium. By way of example and not limitation, the non-transitory computer readable medium comprises computer storage media, such as non-transient storage memory, volatile media, nonvolatile media, removable media, and/or non-removable media implemented in a method or technology for storage of information, such as computer readable instructions, data structures, program modules, or other data.

A user interface module 312 communicates with the GUI 306 or other suitable user interface (e.g., command line interface (CLI)) to manage operation of the dynamic resource configuration system 100 by a user, such as an administrator of the distributed computing environment 114. The user interface module 312 may display status information regarding the distributed computing environment and/or the system 100 and provide an input for modifying the operation of the system 100 by a user. For example, the user interface module 312 may provide an input for changing a rate or frequency at which the resource inspector module 318 inspects each resource in the distributed computing environment 114, or for adding, changing, and/or deleting the various customization policies in the data source 108.

An operations management application interface module 314 provides an interface to the operations management application 106 for transmitting and receiving information about the resources 116. For example, the operations management application interface module 314 may be provided as an interface between the operations management application 106 resource configuration collection module 320 to collect characteristic information about each resource 116 in the distributed computing environment 114.

A network configuration server module 316 communicates with the resources 116 to manage configuration of the network parameters of each resource 116 and provides information to certain resources 116 that may be used to configure other parameters according to their identified characteristics. That is, when the network configuration server module 316 configures the network parameters of a resource 116, the module 316 may also forward additional customized configuration parameters to that resource 116. Examples of customized configuration parameters may include selection of a particular PXE server to be used for booting the resource 116, and/or selection of a specified range of network addresses based upon certain characteristics (e.g., type of applications deployed on the resource 116) associated with that resource 116. For example, during a network configuration process, the network configuration server module 316 may obtain the unique identity and/or type of the resource 116, access the resource information records 110 to obtain characteristics about that resource 116, compare the obtained characteristics against one or more customization policies 112 stored in the data source 108, and transmit customized resource configuration to the resource 116 according to the customization policies 112. In one embodiment, the network configuration server module 316 functions according to a DHCP protocol for configuring the network parameters of each resource 116.

Any type of configuration information may be provided to the resources 116. In one example in which the distributed computing environment 114 has multiple active PXE servers that provide different boot configuration parameters relative to one another, the network configuration server module 316 may use the obtained unique identity to select one particular PXE appropriate for that resource 116 and transmit that information to the resource 116 so that the resource 116 may communicate with that PXE server module 324 for providing the resource's configuration. In another example, the network configuration server module 316 may use characteristic information about the resource 116 stored in the resource information records 110, such as what type of applications are deployed on the resource 116, to assign a network address within a specified range according to the resource 116.

A resource inspector module 318 collects characteristic information about the resources 116 in the distributed computing environment 114 and stores the information resource information records 110 in the data source 108. For example, the resource inspector module 318 may collect resource information on a periodic, ongoing basis to continually update characteristic information stored for each resource 116 in the data source 108. As another example, the resource inspector module 318 may be executed during initial startup using a discovery process in which characteristic information for most or all resources 116 are gathered and stored in the resource information records 110. As yet another example, the resource inspector module 318 may be called by the network configuration server module 316 in the event that a customized configuration is to be provided for a resource 116 and no record for that particular resource 116 exists in the resource information records 110. In this case, the resource inspector module 318 may provide a temporary address to the network configuration server module 314 for obtaining characteristic information about the resource using the temporary address by the resource inspector module 318. Thereafter, the resource 116 may be instructed to renew its network configuration parameters such that a customized configuration may be provided to that resource 116.

A resource custom configuration information collection module 320 receives requests for resource information from the network configuration server module 316, obtains customized configuration parameters, and provides the obtained customized configuration information to the network configuration server module 314 in response to the request. In a particular embodiment in which the network configuration server module 316 functions according to the DHCP protocol, the resource custom configuration information collection module 320 may receive MAC address information from the network configuration server module 316 indicating the unique identity of the resource, use the received MAC address to obtain characteristic information about the resource 116 using the resource information records 110, compare the characteristic information against one or more policies 112 to obtain customized configuration parameters that are then transmitted back to the network configuration server module 314 in response to the request. In one embodiment, the MAC addresses may be organized in a lookup table such that the resource custom configuration information collection module 320 accesses the customized configuration parameters using the MAC address as a reference parameter.

In one embodiment, the collection module 320 may call one or more executable scripts 322 that generate the customized configuration parameters based upon the obtained unique identity of the resource 116. In this manner, each script 322 may function as a modular software component (e.g., a plug-in, an add-on, an extension, etc.) that may be deployed independently of the collection module 320 and/or independently of each other. The scripts 322 as described herein generally refer to specified segments of software code that may be added to or deleted from the system 100 on an as-needed basis. For example, the distributed computing environment 114 may include a converged infrastructure 120 deployed with a certain brand and type of blade cluster that may be optimized using a certain customized configuration. In this case, a custom script 322 may be created that, when a blade from this blade cluster requests configuration, this script 322 may be called and executed to generate customized parameters for optimizing operation of that blade.

A script generally includes a combined set of instructions that, when executed by a computer, perform various functions in association with the computing system they are executed on. The functions performed may include, for example, launching applications, setting environment variables of the operating system and/or hardware components of the computing device, and even calculating values to be used for setting the environment variables. In one embodiment, the scripts comprise an alpha-numeric document file that including multiple instructions. When executed, each instruction is interpreted by the operating system in which it is executed. In one aspect, each instruction generally includes a command with one or more arguments that is interpreted by the operating system (e.g., run-time environment) that could otherwise be executed one at a time via a terminal of the operating system.

The dynamic resource configuration application 104 may also be provided with one or more PXE server modules 324 that provide a pre-boot execution environment for the resources 116 in the distributed computing environment 114. As shown herein, the PXE server modules 324 are implemented as one or more modules as part of the dynamic resource configuration application 104. Nevertheless, other embodiments contemplate that the PXE server modules 324 may be implemented in any suitable manner, such as independently executed PXE servers on a separate and distinct computing device (e.g., a resource 116 of the distributed computing environment 114).

Each PXE server module 324 functions with the network configuration server module 316 to provide a pre-boot sequence for downloading a customized configuration using a trivial file transfer protocol (TFTP). Each of the PXE server modules 324 provides a customized configuration environment for a certain type or class of resource. In many cases, a distributed computing environment 114 may employ numerous types of resources 116 that are ideally suited for functioning with a certain type of PXE server. For example, a group of resources 116 (e.g., blade cluster) provided by a certain manufacturer (e.g., Dell™, EMC Corporation™, Cisco™, etc.) may be specified for operation with one or a small group of PXE servers, while another group of resources is specified for operation with a different PXE server. Thus, each of the PXE server modules 324 provide customized configuration parameters that may be used by those resources 116 for whom they are specified to operate with.

It should be appreciated that the modules described herein are provided only as examples, and that the dynamic resource configuration application 104 may have different modules, additional modules, or fewer modules than those described herein. For example, one or more modules as described in FIG. 3 may be combined into a single module. As another example, certain modules described herein may be encoded on, and executed on other computing systems, such as on one of the hosts 202 of a converged infrastructure 120 as described above with reference to FIGS. 2A and 2B.

Figure 4:
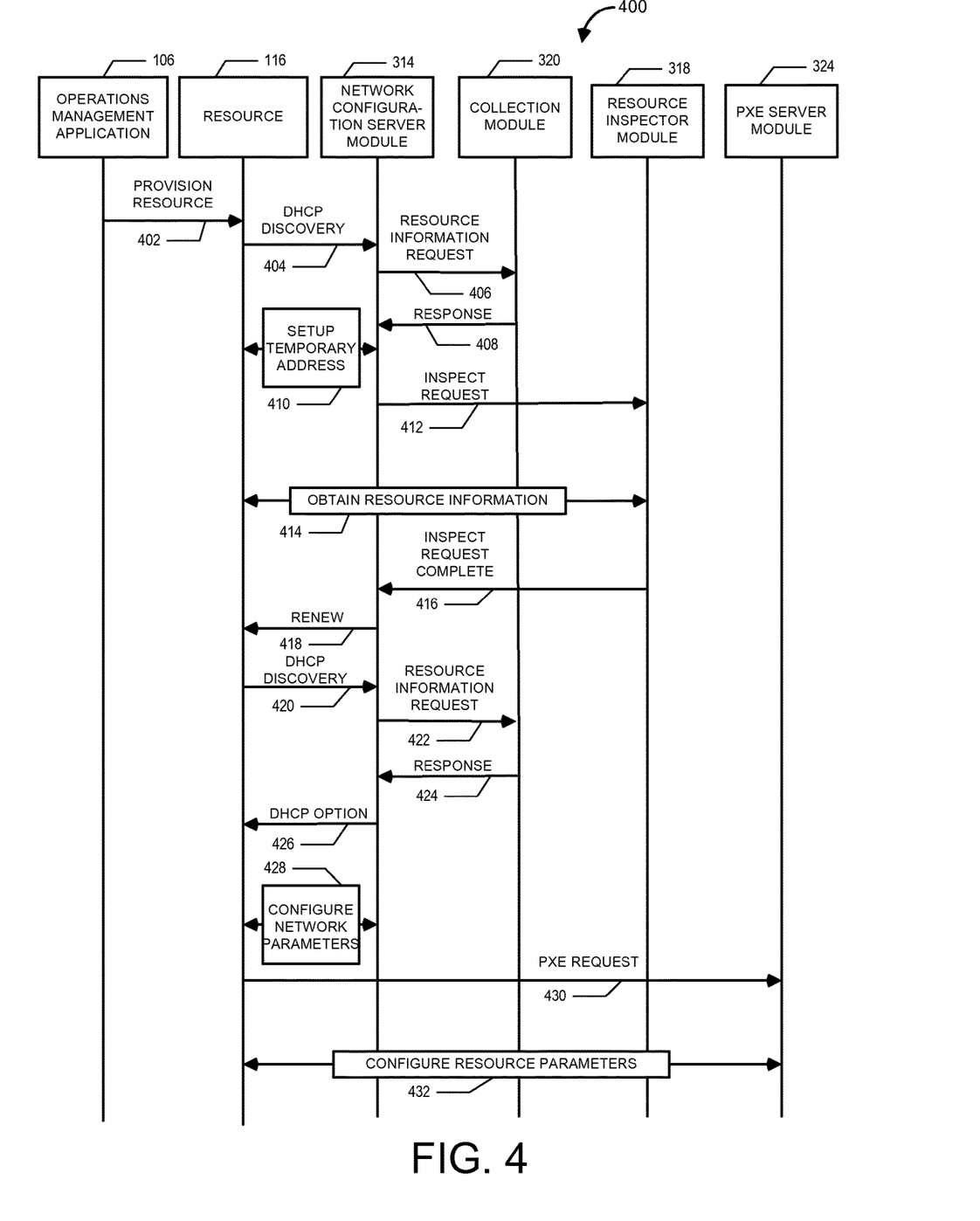
FIG. 4 illustrates an example call flow diagram that may be performed by the system to provide a customized configuration for resources of a distributed computing environment according to one embodiment of the present disclosure.

FIG. 4 illustrates an example call flow diagram 400 showing how the modules of the dynamic resource provisioning application 102 may provide customized configurations for resources 116 of a distributed computing environment 114 according to the teachings of the present disclosure. Although the process herein is described using a network configuration server module 314 that functions according to the DHCP protocol, it should be appreciated that the network configuration module may employ any suitable network configuration protocol without departing from the spirit or scope of the present disclosure. Initially, the operations management application 106 issues a request to provision the resource 116 (operation 402). The resource 116 may be provisioned automatically, such as provided by a batch file that sequentially provisions a group of resources 116 in the distributed computing environment 114.

As a result of the provision request from the operations management application 106, the resource 116 broadcasts a DHCP discover message that is received by the network configuration server module 314 (operation 404). In response to the DHCP discover message, the network configuration server module 316 identifies the resource, such as by reading the source MAC address included in the DHCP discover message, and issues a request including the MAC address to the resource custom configuration information collection module 320 (operation 406). The resource custom configuration information collection module 320 may then use the MAC address information to query the resource information records 110 for obtaining characteristic information associated with that particular resource, and compares the obtained characteristic information with the customization policies 112 to derive one or more customized configuration parameters to be applied to the resource 116.

The resource custom configuration information collection module 320 responds to the network configuration server module 316 with a response message including the customized parameters, or with a null message if no resource information record 110 has been generated for the resource 116 with that MAC address (operation 408). If a null message is received by the network configuration server module 316, processing continues at step 410 to obtain customized parameters for the resource 116, otherwise processing continues at step 430.

Operations 410 through 428 generally describe one example of a process that may be used to obtain characteristic information for a resource 116 that has not been previously obtained by the dynamic resource configuration application 104. Nevertheless, it should be appreciated that customized parameters for resources 116 may be obtained using other techniques, such as by generating a GUI or other form of user input means (e.g., CLI interface) that requests manual input of customized parameter information from a user.

The network configuration server module 316 communicates with the resource 116 to setup a temporary IP address on the resource 116, which may then be used for extracting its characteristic information (operation 410). Thereafter, the network configuration server module 316 issues a request to the resource inspection module 318 to query the resource 116 for its characteristic information (operation 412), which the resource inspection module 318 responds to by communicating with the resource 116, using the assigned temporary IP address, to gather its characteristic information (operation 414). The resource inspection module 318 then issues a resource characteristic information complete message to the network configuration server module 316 indicating that information has now been obtained for the subject resource 116 (operation 416.

The network configuration server module 316 then restarts the process by transmitting a renewal message to the resource 116 instructing it to delete its currently configured network parameters and obtain new network configuration parameters from the network configuration server module 316 (operation 418). At this point, the resource 116, network configuration server module 316, and resource custom configuration information collection module 320 performs operations 418 through 422 in a similar manner to operations 404 through 408 to obtain customized resource configuration parameters for the resource 116.

The network configuration server module 316 transmits a DHCP offer message to the resource 116 that includes customized configuration information to be used for configuring the resource 116 (operation 426). For example, the customized configuration information includes a particular PXE server module 324 to be used for providing a preboot execution sequence for the resource 116.

In another example, the customized configuration information includes a customized range of IP addresses that the resource 116 may use for its configuration. In this case, the network configuration server module 316 generates the customized configuration information by obtaining information about the resource, such as which applications are deployed on the resource, the type of the resource, any sub-networks that the resource is part of, and the like, and comparing this obtained information with customization policies 112 stored in the data source 108 to generate the customized configuration information including a certain range of IP addresses to be used by the resource. In a particular example, the network configuration server module 316 may obtain, using the MAC address of the resource, that an Apache™ HTTP server application is deployed on the resource, and, by accessing the customization policies 112, determine that the resources having a deployed Apache™ HTTP server application deployed is to be provisioned with IP addresses within the range of 169.172.0.0 to 169.172.255.255. The network configuration server module 316 may then include this range of IP addresses in the customized configuration information transmitted to the resource to be provisioned.

Other forms of customized configuration information exist. For example, the customized configuration information may include resource parameters associated with which ports to be used by certain applications, or various resource configuration parameters for any internal firewalls deployed in the resource 116.

The resource 116 communicates with the network configuration server module 316 to configure its network parameters, and (operation 430), transmits a PXE request message to begin a preboot execution sequence (operation 428). In one embodiment, the PXE request message may be a unicast message to a particular PXE server module 324 specified by the network configuration server module 316 via the DHCP offer message received (operation 426). Thereafter, the resource 116 communicates with the PXE server module 324 to configure its resource parameters (operation 432).

The previously describe call flow diagram may be repeated to provide a customized configuration for other resources 116 in the distributed computing environment 114, or to perform another customized configuration for the same resource 116 at a later time due to, for example, a manual request from a user or due to modification to one or more of the policies that trigger another configuration for any resources 116 affected by the modifications. Nevertheless, when use of the dynamic resource configuration application 104 are no longer needed or desired the process ends.

Although FIG. 4 describes one example of a process that may be performed by the dynamic resource configuration system, the features of the disclosed process may be embodied in other specific forms without deviating from the spirit and scope of the present disclosure. For example, the system 100 may perform additional, fewer, or different operations than those operations as described in the present example. As another example, the operations of the process described herein may be performed by a computing system other than the computing system 102, which may be, for example, one of the resources of the distributed computing environment 114.

The description above includes example systems, methods, techniques, instruction sequences, and/or computer program products that embody techniques of the present disclosure. However, it is understood that the described disclosure may be practiced without these specific details.

In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form (e.g., software, processing application) readable by a machine (e.g., a computer). The machine-readable medium may include, but is not limited to, magnetic storage medium (e.g., floppy diskette), optical storage medium (e.g., CD-ROM); magneto-optical storage medium, read only memory (ROM); random access memory (RAM); erasable programmable memory (e.g., EPROM and EEPROM); flash memory; or other types of medium suitable for storing electronic instructions.

Figure 5:
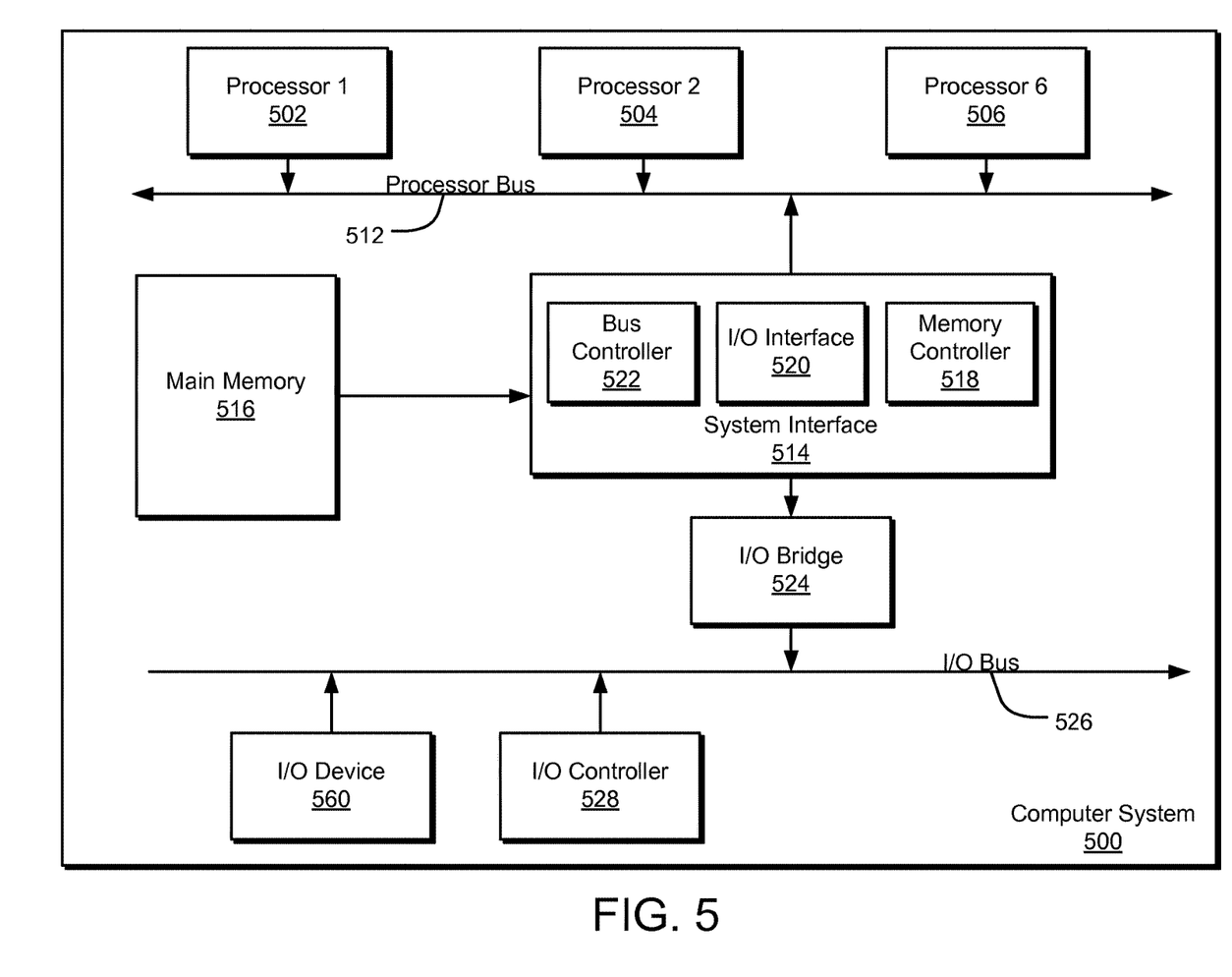
FIG. 5 illustrates an example computer system according to one embodiment of the present disclosure.

For example, FIG. 5 is a block diagram illustrating an example of a host or computer system 500 which may be used in implementing the embodiments of the present disclosure. The computer system (system) includes one or more processors 502-506. Processors 502-506 may include one or more internal levels of cache (not shown) and a bus controller or bus interface unit to direct interaction with the processor bus 512. Processor bus 512, also known as the host bus or the front side bus, may be used to couple the processors 502-506 with the system interface 514. System interface 514 may be connected to the processor bus 512 to interface other components of the system 500 with the processor bus 512. For example, system interface 514 may include a memory controller 513 for interfacing a main memory 516 with the processor bus 512. The main memory 516 typically includes one or more memory cards and a control circuit (not shown). System interface 514 may also include an input/output (I/O) interface 520 to interface one or more I/O bridges or I/O devices with the processor bus 512. One or more I/O controllers and/or I/O devices may be connected with the I/O bus 526, such as I/O controller 528 and I/O device 530, as illustrated.

I/O device 530 may also include an input device (not shown), such as an alphanumeric input device, including alphanumeric and other keys for communicating information and/or command selections to the processors 502-506. Another type of user input device includes cursor control, such as a mouse, a trackball, or cursor direction keys for communicating direction information and command selections to the processors 502-506 and for controlling cursor movement on the display device.

System 500 may include a dynamic storage device, referred to as main memory 516, or a random access memory (RAM) or other computer-readable devices coupled to the processor bus 512 for storing information and instructions to be executed by the processors 502-506. Main memory 516 also may be used for storing temporary variables or other intermediate information during execution of instructions by the processors 502-506. System 500 may include a read only memory (ROM) and/or other static storage device coupled to the processor bus 512 for storing static information and instructions for the processors 502-506. The system set forth in FIG. 5 is but one possible example of a computer system that may employ or be configured in accordance with aspects of the present disclosure.

According to one embodiment, the above techniques may be performed by computer system 500 in response to processor 504 executing one or more sequences of one or more instructions contained in main memory 516. These instructions may be read into main memory 516 from another machine-readable medium, such as a storage device. Execution of the sequences of instructions contained in main memory 516 may cause processors 502-506 to perform the process steps described herein. In alternative embodiments, circuitry may be used in place of or in combination with the software instructions. Thus, embodiments of the present disclosure may include both hardware and software components.

A machine readable medium includes any mechanism for storing or transmitting information in a form (e.g., software, processing application) readable by a machine (e.g., a computer). Such media may take the form of, but is not limited to, non-volatile media and volatile media. Non-volatile media includes optical or magnetic disks. Volatile media includes dynamic memory, such as main memory 516. Common forms of machine-readable medium may include, but is not limited to, magnetic storage medium; optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions.

Embodiments of the present disclosure include various operations or steps, which are described in this specification. The steps may be performed by hardware components or may be embodied in machine-executable instructions, which may be used to cause a general-purpose or special-purpose processor programmed with the instructions to perform the steps. Alternatively, the steps may be performed by a combination of hardware, software and/or firmware.

It is believed that the present disclosure and many of its attendant advantages will be understood by the foregoing description, and it will be apparent that various changes may be made in the form, construction, and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed:

1. A dynamic resource configuration system comprising:
a computing system in communication with a resource, the computing system comprising at least one processor and at least one memory to store computer readable instructions that when executed by the at least one processor:
receive, from the resource, a network configuration request message to configure one or more network parameters of the resource;
obtain a unique identity of the resource using the received network configuration request message;
receive a null message in response to a first resource information record request based on the unique identity of the resource;
assign a temporary Internet Protocol (IP) address to the resource in response to receiving the null message;
transmit, after receiving the null message and to the resource using the assigned temporary IP address, a second resource information record request;
obtain, from the resource and based on the second resource information record request, resource information comprising customized configuration parameters for the resource and characteristic information for the resource;
replace the temporary IP address with a new IP address based on the resource information;
select a preboot execution environment (PXE) server from among a plurality of PXE servers, the selected PXE server to be used for configuration of the resource by applying the customized configuration parameters to the resource in accordance with one or more customization policies; and
communicate with the selected PXE server to configure the resource using the customized configuration parameters.

2. The dynamic resource configuration system of claim 1, wherein the network configuration request message comprises a dynamic host configuration protocol (DHCP) message.

3. The dynamic resource configuration system of claim 2, wherein the computer-readable instructions are executed to obtain the unique identity of the resource by reading a media access control (MAC) address included in the network configuration request message, the MAC address uniquely identifying a communication interface of the resource.

4. The dynamic resource configuration system of claim 3, wherein the computer-readable instructions are executed to obtain the customized configuration parameters by accessing a record stored in the at least one memory, the record associating the MAC address with the customized configuration parameters, the customized configuration parameters included in the record.

5. The dynamic resource configuration system of claim 1, wherein the customized configuration parameters comprise a specified range of network addresses to be assigned to the resource.

6. The dynamic resource configuration system of claim 5, wherein the computer-readable instructions are executed to determine the specified range of network addresses by comparing one or more applications deployed on the resource with a policy, stored in the at least one memory, indicating the specified range of network addresses to be associated with the one or more applications.

7. The dynamic resource configuration system of claim 1, wherein the computer-readable instructions are executed to call a script to obtain the customized configuration parameters for the resource, the script deployed independently of when the dynamic resource configuration system is deployed.

8. A dynamic resource configuration method comprising:
receiving, using instructions stored in a non-transitory, computer-readable medium and executed on at least one processor, a network configuration request message to configure one or more network parameters of a resource;
obtaining, using the instructions executed on the at least one processor, a unique identity of the resource using the received network configuration request message;
receiving, using the instructions executed on the at least one processor, a null message in response to a first resource information record request based on the unique identity of the resource;
assigning, using the instructions executed on the at least one processor, a temporary Internet Protocol (IP) address to the resource in response to receiving the null message;
transmitting, after receiving the null message and to the resource using the assigned temporary IP address, a second resource information record request;
obtaining, from the resource and using the assigned temporary IP address, resource information comprising customized configuration parameters for the resource and characteristic information for the resource;
replacing, using the instructions executed on the at least one processor, the temporary IP address with a new IP address based on the resource information;
selecting, using the instructions executed on the at least one processor, a preboot execution environment (PXE) server from among a plurality of PXE servers, the selected PXE server to be used for configuration of the resource by applying the customized configuration parameters to the resource in accordance with one or more customization policies; and
communicating, using the instructions executed on the at least one processor, with the selected PXE server to configure the resource using the customized configuration parameters.

9. The dynamic resource configuration method of claim 8, wherein the network configuration request message comprises a dynamic host configuration protocol (DHCP) message.

10. The dynamic resource configuration method of claim 9, further comprising obtaining the unique identity of the resource by reading a media access control (MAC) address included in the network configuration request message, the MAC address uniquely identifying a communication interface of the resource.

11. The dynamic resource configuration method of claim 10, further comprising obtaining the customized configuration parameters by accessing a record stored in at least one memory, the record associating the MAC address with the customized configuration parameters, the customized configuration parameters included in the record.

12. The dynamic resource configuration method of claim 8, wherein the customized configuration parameters comprise a specified range of network addresses to be assigned to the resource.

13. The dynamic resource configuration method of claim 12, further comprising determining the specified range of network addresses by comparing one or more applications deployed on the resource with a policy indicating the specified range of network addresses to be associated with the one or more applications.

14. The dynamic resource configuration method of claim 8, further comprising executing a script to obtain the customized configuration parameters for the resource, the script deployed independently of when a dynamic resource configuration system is deployed.

15. A non-transitory computer readable medium comprising computer executable instructions that, when executed by at least one processor, cause the at least on processor to:
receive a network configuration request message to configure one or more network parameters of a resource;
obtain a unique identity of the resource using the received network configuration request message;
receive a null message in response to a first resource information record request based on the unique identity of the resource;
assign a temporary Internet Protocol (IP) address to the resource in response to receiving the null message;
transmit, after receiving the null message and to the resource using the assigned temporary IP address, a second resource information record request;
obtain, from the resource and based on the second resource information record request, resource information comprising customized configuration parameters for the resource and characteristic information for the resource;
replace the temporary IP address with a new IP address based on the resource information;
select a preboot execution environment (PXE) server from among a plurality of PXE servers, the selected PXE server to be used for configuration of the resource by applying the customized configuration parameters to the resource in accordance with one or more customization policies; and
communicate with the selected PXE server to configure the resource using the customized configuration parameters.

16. The non-transitory computer readable medium of claim 15, further comprising computer executable instructions to obtain the unique identity of the resource by reading a media access control (MAC) address included in the network configuration request message, the MAC address uniquely identifying a communication interface of the resource.

* * * * *